United States Patent
Addison, Jr.

(10) Patent No.: US 7,254,584 B1
(45) Date of Patent: Aug. 7, 2007

(54) RELATIONSHIP-BASED INHERITED ATTRIBUTES SYSTEM

(75) Inventor: Stayton (Skip) D. Addison, Jr., San Jose, CA (US)

(73) Assignee: AOL LLC, Dulles, VA (US)

( * ) Notice: Subject to any disclaimer, the term of this patent is extended or adjusted under 35 U.S.C. 154(b) by 0 days.

(21) Appl. No.: 10/276,813

(22) PCT Filed: May 17, 2000

(86) PCT No.: PCT/US00/13704

§ 371 (c)(1),
(2), (4) Date: Nov. 15, 2003

(87) PCT Pub. No.: WO01/88756

PCT Pub. Date: Nov. 22, 2001

(51) Int. Cl.
*G06F 17/30* (2006.01)
(52) U.S. Cl. .............. 707/103; 707/103 R; 707/103 Y; 707/103 X; 707/103 Z
(58) Field of Classification Search ..... 707/103 R–103 Z, 3, 200; 705/39
See application file for complete search history.

(56) References Cited

U.S. PATENT DOCUMENTS

| | | | | |
|---|---|---|---|---|
| 5,499,371 | A | | 3/1996 | Henninger et al. .......... 395/700 |
| 5,604,892 | A | * | 2/1997 | Nuttall et al. .................. 703/18 |
| 6,014,647 | A | * | 1/2000 | Nizzari et al. ................. 705/39 |
| 6,078,926 | A | * | 6/2000 | Jensen et al. ........... 707/103 R |
| 6,091,895 | A | * | 7/2000 | Govindaraj .................. 717/114 |
| 6,249,791 | B1 | * | 6/2001 | Osborn et al. .............. 707/200 |
| 6,374,252 | B1 | * | 4/2002 | Althoff et al. .............. 707/102 |
| 6,470,354 | B1 | * | 10/2002 | Aldridge et al. ........ 707/103 Y |
| 6,519,588 | B1 | * | 2/2003 | Leschner ....................... 707/3 |

(Continued)

OTHER PUBLICATIONS

Incorporating Hierarchy in a Relational Model of Data; H. Jagadish; 1989.

(Continued)

*Primary Examiner*—Don Wong
*Assistant Examiner*—Hanh Thai
(74) *Attorney, Agent, or Firm*—Michael A. Glenn; Glenn Patent Group

(57) ABSTRACT

A relationship-based inherited attributes system provides an Inheritance Table where each object in the table has an Inherited Object ID. Each ID is listed with all of the ID's that the object inherits from with sequence number that indicates the order of the inheritance in the hierarchy. A Relationship Table is provided and contains a Relationship ID, a Role, and an Assigned Object ID. To find up all of the objects participating in a certain relationship, the server looks for all the rows that have a particular relationship ID in the relationship table. The invention provides an Assignment Table where the server obtains a value by correlating the list of objects obtained from the Inheritance and Relationship tables. The value may need to be processed further and is passed to a JavaScript routine named in the table. The server refers to an Attribute Voter Table when multiple values result and conflicts arise because of this situation. The Attribute Voter Table contains Attribute ID, Role, and Sequence Number fields where the Sequence Number indicates the Role's priority. An Attribute Definition Table is provided to resolve multiple set of roles obtained from the Attribute Voter Table down to one value or set of values. A Resolution Strategy is used to resolve conflicts that arise when the server SQL query returns a such a list of items.

36 Claims, 23 Drawing Sheets

| Inherited Object ID | Assigned Object ID | Seq # |
|---|---|---|
| Skip | Skip | 1 |
| Skip | Bx Engineering | 2 |
| Skip | APD | 3 |
| Skip | AOL | 4 |
| Xmas LB | Xmas LB | 1 |
| Xmas LB | Light Bulbs | 2 |
| Xmas LB | Elect. Goods | 3 |
| Xmas LB | Durable Goods | 4 |

Inheritance Table

U.S. PATENT DOCUMENTS 6,629,081 B1 * 9/2003 Cornelius et al. ............. 705/30
6,662,199 B1 * 12/2003 Flight et al. ............. 707/104.1
6,834,286 B2 * 12/2004 Srinivasan et al. ..... 707/103 R
6,868,425 B1 * 3/2005 Bergstraesser et al. . 707/103 R
2005/0004978 A1 * 1/2005 Reed et al. ................. 709/203

OTHER PUBLICATIONS

Resolving Inheritance of Data Using a Relational Database; IBM Corp.; 1992.

* cited by examiner

| | | | |
|---|---|---|---|
| 101 → Company | 109 ↗ | Durable Goods | ← 105 |
| 102 → Division | Shipping Method = UPS | Electrical Supplies | ← 106 |
| 103 → Department | | Light Bulbs | ← 107 |
| 104 → User | | Christmas Light Strand | ← 108 |

*FIG. 1*

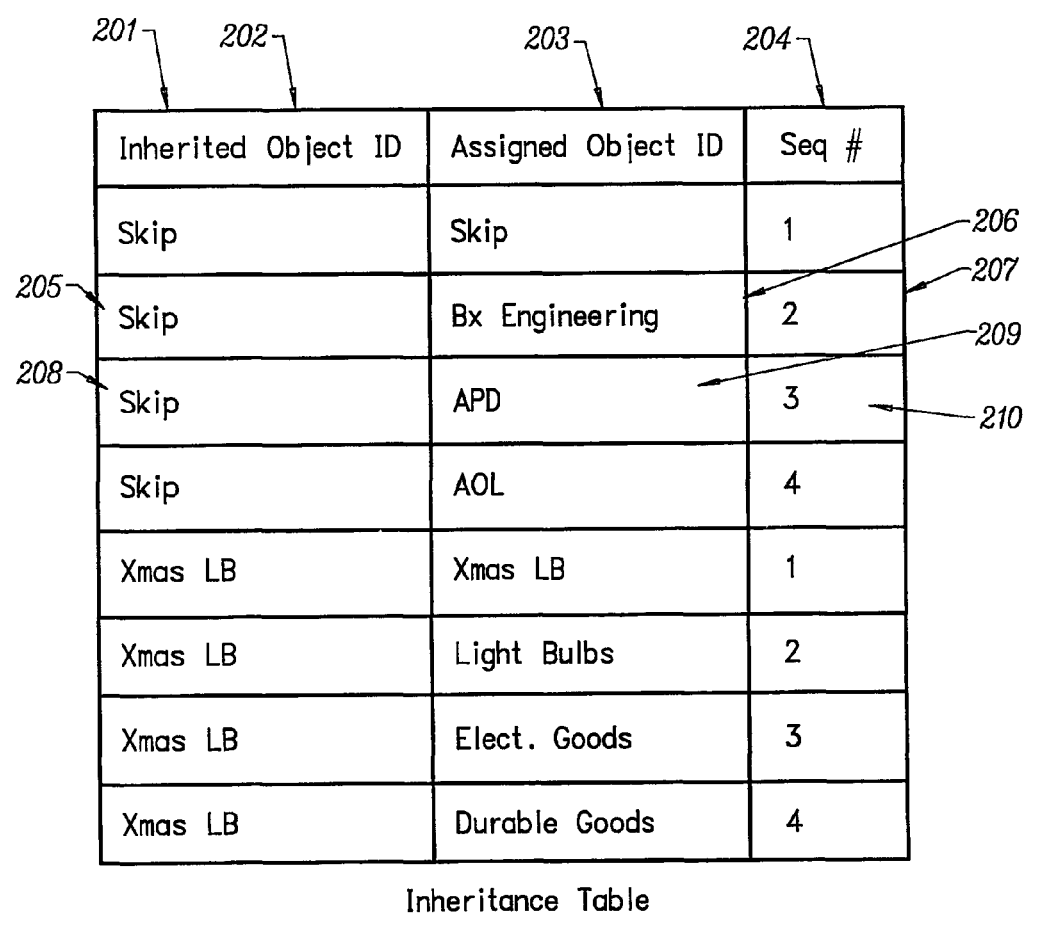

| Inherited Object ID | Assigned Object ID | Seq # |
|---|---|---|
| Skip | Skip | 1 |
| Skip | Bx Engineering | 2 |
| Skip | APD | 3 |
| Skip | AOL | 4 |
| Xmas LB | Xmas LB | 1 |
| Xmas LB | Light Bulbs | 2 |
| Xmas LB | Elect. Goods | 3 |
| Xmas LB | Durable Goods | 4 |

Inheritance Table

FIG. 2

| Assignment ID 401/402 | Rel ID 403 | Attr Name 404 | Attr Type 405 | Value 406 | Seq # 407 | Operation 408 | JavaScript Model Name 409 |
|---|---|---|---|---|---|---|---|
| | 1000 410 | Ship Meth 411 | String 412 | UPS 413 | | | |
| | 1001 414 | Ship Meth 415 | String 416 | Will Call 417 | | | |

*FIG. 4*

Assignment Table

| Attribute ID | Role | Seq# |
|---|---|---|
|  | Product | |
|  | Buyer | |
|  |  | |

Attribute Voter Table

*FIG. 5*

| Attribute ID | Attribute Name | Resolution Stragegy | Multi Value | Type |
|---|---|---|---|---|
| | | LIFO | | |
| | | set operations | X | |
| | | | | |

Attribute Definition Table

*FIG. 6*

| object id | attribute name | value |
|---|---|---|
| C1000 | FREIGHT TERMS ID | "1234" |

Simple Attribute Assignment

Simple Attribute Assignment With Types

| object_id | attribute_name | value |
|---|---|---|
| C1000 | "FREIGHT TERMS ID" | 1234 |
| C1001 | "FREIGHT TERMS ID" | 1234 |
| OU1002 | "FREIGHT TERMS ID" | 1234 |
| OU1003 | "FREIGHT TERMS ID" | 1234 |
| OU1004 | "FREIGHT TERMS ID" | 1234 |
| OU1005 | "FREIGHT TERMS ID" | 1234 |
| OU1006 | "FREIGHT TERMS ID" | 1234 |
| OU1007 | "FREIGHT TERMS ID" | 1234 |
| OU1008 | "FREIGHT TERMS ID" | 1234 |
| OU1009 | "FREIGHT TERMS ID" | 1234 |
| OU1010 | "FREIGHT TERMS ID" | 1234 |
| G1011 | "FREIGHT TERMS ID" | 1234 |
| G1012 | "FREIGHT TERMS ID" | 1234 |
| G1013 | "FREIGHT TERMS ID" | 1234 |
| G1014 | "FREIGHT TERMS ID" | 1234 |
| C1015 | "FREIGHT TERMS ID" | 1234 |
| OU1016 | "FREIGHT TERMS ID" | 1234 |

"Promiscuous Write" Optimization

FIG. 10

| object_id | attribute_name | value |
|---|---|---|
| C1000 | "FREIGHT TERMS ID" | 1234 |
| C1001 | "FREIGHT TERMS ID" | 1234 |
| OU1002 | "FREIGHT TERMS ID" | 1234 |
| OU1003 | "FREIGHT TERMS ID" | 1234 |
| OU1004 | "FREIGHT TERMS ID" | 1234 |
| OU1005 | "FREIGHT TERMS ID" | 1220 |
| OU1006 | "FREIGHT TERMS ID" | 1220 |
| OU1007 | "FREIGHT TERMS ID" | 1220 |
| OU1008 | "FREIGHT TERMS ID" | 1220 |
| OU1009 | "FREIGHT TERMS ID" | 1220 |
| OU1010 | "FREIGHT TERMS ID" | 1220 |
| G1011 | "FREIGHT TERMS ID" | 1234 |

Segment of Flooded Attribute Table After Update

*FIG. 11*

| object_id | attribute_name | value | assigned obj_id |
|---|---|---|---|
| C1000 | "FREIGHT TERMS ID" | 1234 | C1000 |
| C1001 | "FREIGHT TERMS ID" | 1234 | C1000 |
| OU1002 | "FREIGHT TERMS ID" | 1234 | C1000 |
| OU1003 | "FREIGHT TERMS ID" | 1234 | C1000 |
| OU1004 | "FREIGHT TERMS ID" | 1234 | C1000 |
| OU1005 | "FREIGHT TERMS ID" | 1220 | OU1005 |
| OU1006 | "FREIGHT TERMS ID" | 1220 | OU1005 |
| OU1007 | "FREIGHT TERMS ID" | 1220 | OU1007 |
| OU1008 | "FREIGHT TERMS ID" | 1220 | OU1007 |
| OU1009 | "FREIGHT TERMS ID" | 1220 | OU1005 |
| OU1010 | "FREIGHT TERMS ID" | 1220 | OU1005 |
| G1011 | "FREIGHT TERMS ID" | 1234 | C1000 |

Promiscuous Write with Assignment Comumns

*FIG. 12*

| attribute name | value | assigned obj_id |
|---|---|---|
| "FREIGHT TERMS ID" | 1234 | C1000 |
| "FREIGHT TERMS ID" | 1220 | OU1007 |

Normalized Assignments ("assignment" table)

*FIG. 13*

| object_id | assigned_obj_id |
|---|---|
| C1000 | C1000 |
| C1001 | C1000 |
| OU1002 | C1000 |
| OU1003 | C1000 |
| OU1004 | C1000 |
| OU1005 | C1000 |
| OU1006 | C1000 |
| OU1007 | OU1007 |
| OU1008 | OU1007 |
| OU1009 | C1000 |
| OU1010 | C1000 |
| G1011 | C1000 |
| G1012 | C1000 |
| G1013 | C1000 |
| G1014 | C1000 |
| C1015 | C1000 |
| OU1016 | C1000 |

Inheritance ("inheritance" table)

*FIG. 14*

| object_id | inh_seq | assigned obj_id |
|---|---|---|
| 0 | 1 | 0 |
| C1000 | 1 | 0 |
| C1000 | 2 | C1000 |
| C1001 | 1 | 0 |
| C1001 | 2 | C1000 |
| C1001 | 3 | C1001 |
| OU1002 | 1 | 0 |
| OU1002 | 2 | C1000 |
| OU1002 | 3 | C1001 |
| OU1002 | 4 | OU1002 |
| OU1003 | 1 | 0 |
| OU1003 | 2 | C1000 |
| OU1003 | 3 | C1001 |
| OU1003 | 4 | OU1002 |
| OU1003 | 5 | OU1003 |
| OU1004 | 1 | 0 |
| OU1004 | 2 | C1000 |
| OU1004 | 3 | C1001 |
| OU1004 | 4 | OU1002 |
| OU1004 | 5 | OU1003 |
| OU1004 | 6 | OU1004 |
| U1000 | 1 | 0 |
| U1000 | 2 | C1000 |
| U1000 | 3 | C1001 |
| U1000 | 4 | OU1002 |
| U1000 | 5 | OU1003 |
| U1000 | 6 | OU1004 |
| U1000 | 7 | U1000 |
| OU1005 | 1 | 0 |
| OU1005 | 2 | G1000 |
| OU1005 | 3 | G1001 |
| OU1005 | 4 | OU1005 |
| OU1006 | 1 | 0 |
| OU1006 | 2 | C1000 |
| OU1006 | 3 | C1001 |
| OU1006 | 4 | OU1005 |
| OU1006 | 5 | OU1006 |
| OU1007 | 1 | 0 |
| OU1007 | 2 | C1000 |
| OU1007 | 3 | C1001 |

*FIG. 15A*

| | | |
|---|---|---|
| OU1007 | 4 | OU1005 |
| OU1007 | 5 | OU1006 |
| OU1007 | 6 | OU1007 |
| OU1007 | 1 | 0 |
| OU1007 | 2 | C1000 |
| OU1007 | 3 | C1001 |
| OU1007 | 4 | OU1005 |
| OU1007 | 5 | OU1006 |
| OU1007 | 6 | OU1007 |
| OU1007 | 7 | OU1008 |
| U1001 | 1 | 0 |
| U1001 | 2 | C1000 |
| U1001 | 3 | C1001 |
| U1001 | 4 | OU1005 |
| U1001 | 5 | OU1006 |
| U1001 | 6 | OU1007 |
| U1001 | 7 | OU1008 |
| U1001 | 8 | U1001 |
| OU1009 | 1 | 0 |
| OU1009 | 2 | C1000 |
| OU1009 | 3 | C1001 |
| OU1009 | 4 | OU1005 |
| OU1009 | 5 | OU1009 |
| OU1010 | 1 | 0 |
| OU1010 | 2 | C1000 |
| OU1010 | 3 | C1001 |
| OU1010 | 4 | OU1005 |
| OU1010 | 5 | OU1009 |
| OU1010 | 6 | OU1010 |
| U1002 | 1 | 0 |
| U1002 | 2 | C1000 |
| U1002 | 3 | C1001 |
| U1002 | 4 | OU1005 |
| U1002 | 5 | OU1009 |
| U1002 | 6 | OU1010 |
| U1002 | 7 | U1002 |
| U1003 | 1 | 0 |
| U1003 | 2 | C1000 |

*FIG. 15B*

| | | |
|---|---|---|
| U1003 | 3 | G1001 |
| U1003 | 4 | OU1005 |
| U1003 | 5 | OU1009 |
| U1003 | 6 | OU1010 |
| U1003 | 7 | U1002 |
| G1011 | 1 | 0 |
| G1011 | 2 | C1000 |
| G1011 | 3 | C1001 |
| G1011 | 4 | G1011 |
| G1012 | 1 | 0 |
| G1012 | 2 | C1000 |
| G1012 | 3 | C1001 |
| G1012 | 4 | G1012 |
| G1013 | 1 | 0 |
| G1013 | 2 | C1000 |
| G1013 | 3 | C1001 |
| G1013 | 4 | G1012 |
| G1013 | 5 | G1013 |
| G1014 | 1 | 0 |
| G1014 | 2 | C1000 |
| G1014 | 3 | C1001 |
| G1014 | 4 | G1012 |
| G1014 | 5 | G1014 |
| G1020 | 1 | 0 |
| G1020 | 2 | C1000 |
| G1020 | 3 | C1001 |
| G1020 | 4 | G1020 |
| G1021 | 1 | 0 |
| G1021 | 2 | C1000 |
| G1021 | 3 | C1001 |
| G1021 | 4 | G1021 |
| C1015 | 1 | 0 |
| C1015 | 2 | C1000 |
| C1015 | 3 | C1015 |
| OU1016 | 4 | 0 |
| OU1016 | 2 | C1000 |
| OU1016 | 3 | C1015 |
| OU1016 | 4 | OU1016 |

FIG. 15C

| | | |
|---|---|---|
| U1004 | 1 | 0 |
| U1004 | 2 | C1000 |
| U1004 | 3 | C1015 |
| U1004 | 4 | OU1016 |
| U1004 | 5 | U1004 |
| C1024 | 1 | 0 |
| C1024 | 2 | G1020 |
| C1024 | 3 | C1024 |
| PL1241 | 1 | 0 |
| PL1241 | 2 | G1020 |
| PL1241 | 3 | C1024 |
| PL1241 | 4 | PL1241 |
| P12401 | 1 | 0 |
| P12401 | 2 | G1020 |
| P12401 | 3 | G1024 |
| P12401 | 4 | P1240 |
| C10261 | 1 | 0 |
| C10261 | 2 | G1021 |
| C10261 | 3 | C1025 |
| PL1261 | 1 | 0 |
| PL1261 | 2 | G1021 |
| PL1261 | 3 | C1026 |
| PL1261 | 4 | PL1261 |
| P1260 | 1 | 0 |
| P1260 | 2 | G1021 |
| P1260 | 3 | C1026 |
| P1260 | 4 | P1260 |

*FIG. 15D*

| | | |
|---|---|---|
| U1001 | 9 | G1012 |
| U1001 | 10 | G1014 |

*FIG. 16*

| object_id | inh_seq | assigned_obj_id | attribute_name | value |
|---|---|---|---|---|
| U1001 | 2 | C1000 | "FREIGHT_TERMS_ID" | 1234 |
| U1001 | 6 | OU1007 | "FREIGHT_TERMS_ID" | 1220 |

*FIG. 17*

| reln_id | role | assigned_object_id |
|---|---|---|
| 100 | USER | U1000 |
| 100 | PRODUCT | P12345 |
| 100 | PRICE_LIST | PL1000 |

Relationship Table

*FIG. 18*

| reln_id | role | assigned_object_id |
|---------|------------|--------------------|
| 110 | USER | C1000 |
| 110 | PRODUCT | 0 |
| 110 | PRICE_LIST | 0 |
| 134 | USER | OU1007 |
| 134 | PRODUCT | G1020 |
| 134 | PRICE_LIST | 0 |

Relationship Table Using Inheritance

FIG. 19

| attribute_name | value | rein_id |
|-------------------|-------|---------|
| PRICE_LIST_COLUMN LOOKUP | 1234 | 110 |
| PRICE_LIST_COLUMN LOOKUP | 1220 | 134 |

Assignment Table (Relationship-Based)

FIG. 20

| USER_SEQ | PROD_SEQ | PL_EQ | VALUE |
|----------|----------|-------|-------|
| 2 | 1 | 1 | 1234 |

FIG. 21

| USER_SEQ | PROD_SEQ | PL_SEQ | VALUE |
|---|---|---|---|
| 2 | 1 | 1 | 1234 |
| 6 | 2 | 1 | 1220 |

FIG. 22

| USER_SEQ | PROD_SEQ | PL_SEQ | VALUE |
|---|---|---|---|
| 2 | 1 | 1 | 1234 |
| 4 | 3 | 4 | 1367 |
| 6 | 2 | 1 | 1220 |

FIG. 23

| object_id | inh_seq | assigned_obj_id |
|---|---|---|
| U1001 | 1 | 0 |
| U1001 | 2 | C1000 |
| U1001 | 3 | C1001 |
| U1001 | 4 | OU1005 |
| U1001 | 5 | OU1006 |
| U1001 | 6 | OU1007 |
| U1001 | 7 | OU1008 |

FIG. 24

| U1001 | 8 | G1012 |
| U1001 | 9 | G1014 |

*FIG. 25*

| U1001 | 10 | G1011 |

*FIG. 26*

| U1001 | 11 | G1001 |

*FIG. 27*

| Value set 1 | operation | Value set 2 | Result | Notes |
|---|---|---|---|---|
| [2000,2001, 2002] | override | [2002, 2003] | [2002, 2003] | LIFO |
| [2000,2001 2002] | add value | [2002, 2003] | [2000, 2001, 2002,2 003] | UOS |
| [2000,2001 2002] | remove value | [2002, 2003] | [2000, 2001] | |
| [2000,2001 2002] | IOS | [2002, 2003] | [2002] | |
| [2000,2001 2002] | merge | [2002, 2003] | | invalid operation |
| [2000,2001 2002] | lowest | [2002, 2003] | | invalid operation |
| [2000,2001 2002] | highest | [2002, 2003] | | invalid operation |
| NTV{ "foo"Int 3 "name" Str "Nancy" } | override | NTV{ "foo" Int 4, "bar" Str "New York" } | NTV{ "foo" Int 4, "bar" Str "New York" } | |
| NTV{ "foo" Int 3, "name" Str "Nancy" } | add value | NTV{ "foo" Int 4, "bar" Str "New York" } | { } | invalid operation |

FIG. 28A

| | | | |
|---|---|---|---|
| NTV{ "foo" Int 3, "name" Str "Nancy" } | remove value | NTV{ "foo" Int 4, "bar" Str "New York" } | invalid operation |
| NTV{ "foo" Int 3, "name" Str "Nancy" } | IOS | NTV{ "foo" Int 4, "bar" Str "New York" } | invalid operation |
| NTV{ "foo" Int 3, "name" Str "Nancy" } | merge | NTV{ "foo" Int 4, "bar" Str "New York" } | NTV{ "foo" Int 4, "name" Str "Nancy" "bar" Str "New York" } |
| 1 | override | -2 | -2 |
| 1 | add value | -2 | [-1, -2] |
| 1 | remove value | -2 | -1 |
| 1 | IOS | -2 | null value |
| 1 | merge | -2 | -2 |
| 1 | lowest | -2 | -2 |
| 1 | highest | -2 | -1 |

*FIG. 28B* Result Set Operations

| attribute_name | seq | value | rein_id | operation |
|---|---|---|---|---|
| "DCAPS" | 1 | 2000 | 110 | 0 |
| "DCAPS" | 2 | 2001 | 110 | 0 |
| "DCAPS" | 3 | 2002 | 110 | 0 |
| "DCAPS" | 1 | 2003 | 134 | 1 |

Relationship Assignment Table

*FIG. 29*

RELATIONSHIP-BASED INHERITED ATTRIBUTES SYSTEM

BACKGROUND OF THE INVENTION

1. Technical Field

The invention relates to accessing and organizing information in an electronic database in a computer environment. More particularly, the invention relates to the organization of data into a table-driven relational database system combining both relationship-based values and inherited attribute values in a computer environment.

2. Description of the Prior Art

E-commerce, as well as other business areas, requires different program operations based on factors such as who the buyer is, what it is that he is buying, and where he is shipping it to. Customarily, these information are hard coded at a given installation, where it is fairly easy to write the logic in normal software (e.g., C++). The problem is that the result is not easily configurable for other situations.

The challenge, especially in a buying system, is identifying not only who the person is, for example in a consumer Web site, but what department the person is in, what division the department is in, and what subsidiary the division is in. There is an hierarchical organizational structure involved.

Products have an hierarchy themselves. For example, light bulbs may be part of electrical items which may be part of durable goods.

Administrators frequently want to manage operations based on the hierarchical structure involved. For example, when a certain division buys durable goods, then a particular shipping method is chosen by default. This means that there are associated parameters that must be configured based on some arbitrary hierarchy, such as user groups, product groups, and promotional items.

A product could be: Christmas light bulbs go on sale December 26, otherwise they obey the rules of the durable goods, electrical supplies, light bulbs hierarchy. This is a multiple inheritance scenario. A product inherits attributes based on its structural organization—where it is in some classification system—but it is also based on arbitrary groupings that the vendor may make up.

Another problem that arises is that shipping methods and any choices presented to the user, are based on the relationship between two or more objects, each of which is playing a role, typically in the context of a transaction. For example, if the system is trying to find a shipping method, some typical roles would be: who the buyer is; what the product is; where it is being shipped from; and where it is being shipped to. The buyer may be identified based on when the role was set up for the division. However, it is undesirable to have the system figure out at runtime, i.e. when the query is being made, what every combination is for that buyer.

Three current approaches are property tables, attribute tables and access control lists:

Property Tables

Some applications maintain one or more "property tables" that can associate name value pairs with objects such as Users and Products. Property values are typically strings or string arrays, but more sophisticated implementation also support numbers or dates in a native fashion. The set of properties that can be stored in a property table is unconstrained. It does not have to be determined or anticipated by the application designers. Property tables only store values for objects, not relationships.

Relationship Tables

Some applications maintain one or more "relationship tables" to establish a relationship between two or more objects. Besides describing the relationship between objects, a relationship table can store some information about that relationship. For example, a single line on a purchase requisition may be said to be a relationship between a person and a product, with information such as the quantity ordered as attributes of that relationship. This is a two-way relationship.

The shipping charge for that line item can be based on the shipping origin, the destination and the product. This an example of a three-way relationship. Obviously the number of combinations can grow very large.

Typically the set of properties stored in a relationship table must be determined in advance by a database designer. Hierarchies are not addressed.

Access Control Lists

While ACL wasn't designed for generalized name:value storage, internally its structure is very much the same if privileges can be thought of as attribute names. ACL provides no equivalent of an attribute value, only the presence or absence of the attribute (a.k.a. privilege). ACL provides privileges between "member" groups and "resource" groups.

The problems with the current approaches are the following:

Lack of support for relationship-based values: Properties are owned by objects, not by the relationship between objects, therefore one can't set different values based on the parties in the relationship.

Lack of support for inherited values: Netscape Communication Corp.'s CommerceXpert requires the ability to group users and resources, and to support hierarchies of these groups. Examples include hierarchical user groups, org charts, catalog nodes, product groups and resource groups. Note that inheritance is needed on all ends of the relationship-based attribute value.

Native data types: Most property tables do not support native data types, preventing the database from efficiently recognizing that 500 is less than 1000 in a sort operation.

Extensible attributes: Most mechanisms make it difficult to define new attributes. In most cases a schema change is required to add attributes. Schema changes are not normally performed on running systems.

Flexible relationships: Few relational mechanisms allow for an arbitrary number of participants in a relationship.

It would be advantageous to provide a relationship-based inherited attributes system that gives the system administrator the ability to write determinative business or access rules using configurable parameters. It would further be advantageous to provide a relationship-based inherited attributes system that is user configurable, where the user can dynamically define what attributes and roles are involved.

SUMMARY OF THE INVENTION

The invention provides a relationship-based inherited attributes system. The system allows a system administrator to create determinative business or access rules using configurable parameters. In addition, the invention provides a system that allows a user to dynamically define what attributes and roles are involved.

A preferred embodiment of the invention provides an Inheritance Table. Each object in the Inheritance Table has an Inherited Object ID. Each ID is listed with all of the ID's that the object inherits from (Assigned Object ID). A sequence number indicates the order of the inheritance in the hierarchy.

A Relationship Table is provided and contains a Relationship ID, a Role, and an Assigned Object ID.

To find all of the objects participating in a certain relationship, the server looks for all the rows that have a particular relationship ID.

The invention provides an Assignment Table. The server obtains a value from the Assignment Table by correlating the list of object obtained from the Inheritance and Relationship tables. The value may need to be processed further and is passed to a JavaScript routine named in the table.

When multiple values result and conflicts arise because of this situation, the server refers to an Attribute Voter Table. The Attribute Voter Table contains Attribute ID, Role, and Sequence Number fields. The Sequence Number indicates the Role's priority.

An Attribute Definition Table is provided to resolve multiple set of roles obtained from the Attribute Voter Table down to one value or set of values. A Resolution Strategy is used to resolve conflicts that arise when the server SQL query returns a such a list of items.

Other aspects and advantages of the invention will become apparent from the following detailed description in combination with the accompanying drawings, illustrating, by way of example, the principles of the invention.

BRIEF DESCRIPTION OF THE DRAWINGS

FIG. 1 is a diagram of a set of hierarchical relationships according to the invention;

FIG. 2 is a diagram of an inheritance table according to the invention;

FIG. 4 is a diagram of an assignment table according to the invention;

FIG. 5 is a diagram of an attribute voter table according to the invention;

FIG. 6 is a diagram of an attribute definition table according to the invention;

FIG. 10 is a diagram depicting a promiscuous write optimization operation according to the invention;

FIG. 11 is a diagram depicting a segment of a flooded attribute table after an update according to the invention;

FIG. 12 is a diagram depicting an assignment table showing a promiscuous write with assignment columns according to the invention;

FIG. 13 is a diagram depicting an assignment table with normalized assignments according to the invention;

FIG. 14 is a diagram of an inheritance table according to the invention;

FIG. 15a is a diagram depicting an expanded inheritance table according to the invention;

FIG. 15b is a diagram depicting an expanded inheritance table according to the invention;

FIG. 15c is a diagram depicting an expanded inheritance table according to the invention;

FIG. 15d is a diagram depicting an expanded inheritance table according to the invention;

FIG. 16 is a diagram depicting a portion of an inheritance table for a user according to the invention;

FIG. 17 is a diagram depicting the resulting rows from a read operation from an assignment table according to the invention;

FIG. 18 is a diagram of a relationship table according to the invention;

FIG. 19 is a diagram of a relationship table using inheritance according to the invention;

FIG. 20 is a diagram of a relationship-based assignment table according to the invention;

FIG. 21 is a diagram depicting the result of a query for a purchase transaction according to the invention;

FIG. 22 is a diagram depicting the result of a query for a purchase transaction according to the invention;

FIG. 23 is a diagram depicting a conflict set according to the invention;

FIG. 24 is a diagram of an exemplary inheritance table according to the invention;

FIG. 25 is a diagram depicting the result of a read operation for a group according to the invention;

FIG. 26 is a diagram depicting the result of a read operation for a group according to the invention;

FIG. 27 is a diagram depicting the result of a read operation for a user according to the invention;

FIG. 28a is a diagram depicting the results of set operations on example sets according to the invention;

FIG. 28b is a diagram depicting the results of set operations on example sets according to the invention; and FIG. 29 is a diagram of a relationship assignment table according to the invention.

DETAILED DESCRIPTION OF THE INVENTION

Figure 3:
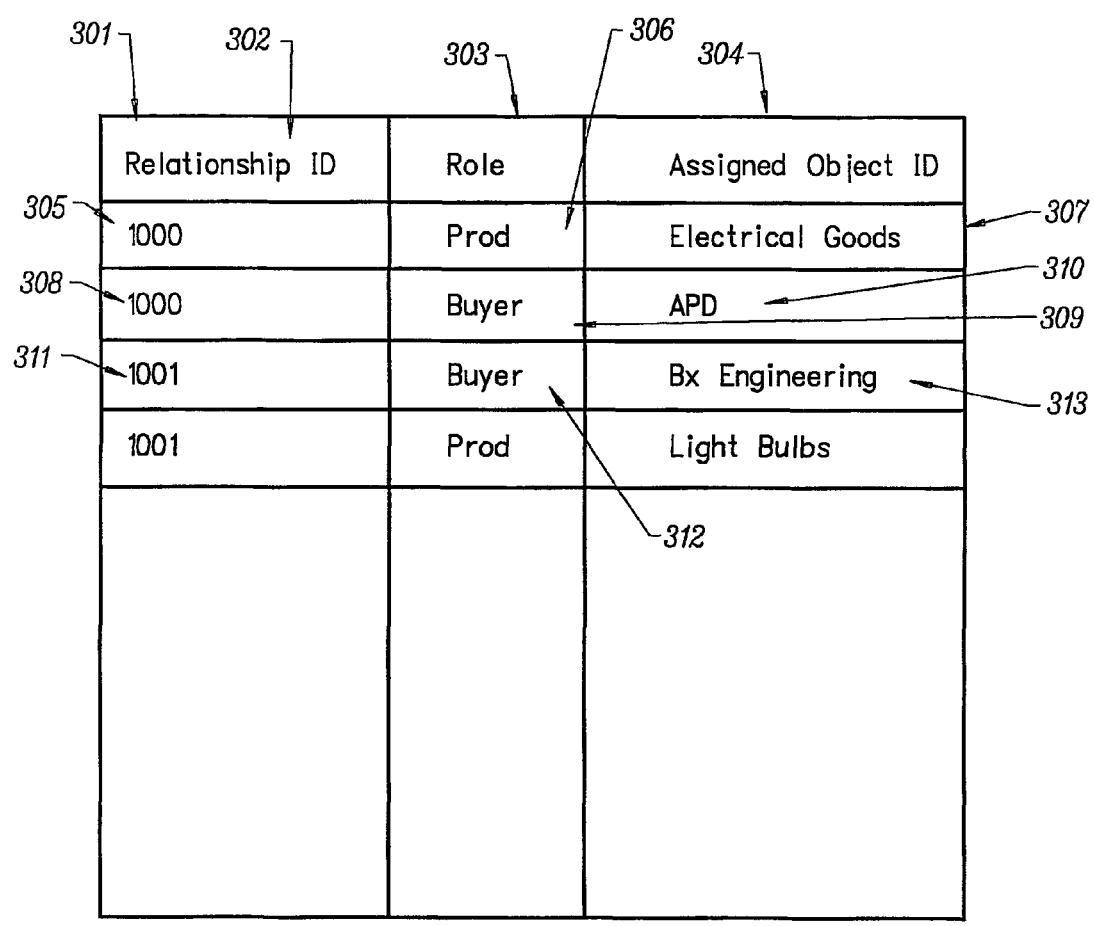
FIG. 3 is a diagram of a relationship table according to the invention.

The invention is embodied in a relationship-based inherited attributes system in a computer environment. A system according to the invention allows a system administrator to create determinative business or access rules using configurable parameters. In addition, the invention provides a system that is user configurable, where the user can dynamically define what attributes and roles are involved.

A preferred embodiment of the invention provides an attribute server and related schema that meets the following needs and implementation criteria:

Inherited attribute values.
Relationship-based attribute values.
High-performance, especially for read operations.
Scalability.
A variety of data types, including strings, integers, doubles, dates, NTVs and arrays of each.

Referring to FIG. 1, a simple e-commerce example is used to explain the basic concepts of a preferred embodiment of the invention. Here, a corporate structure is shown with the company 101 at the top level followed by a division 102, department 103, and user 104. A hierarchy of a product line is also shown with durable goods 105 at the top level followed by electrical supplies 106, light bulbs 107, and Christmas light bulbs 108. Each level of the corporate or product hierarchy may have a specific type or set of shipping methods used. For example, the division 102, when purchasing electrical supplies 106, has the shipping method of UPS 109.

With respect to FIG. 2, the invention provide an Inheritance Table 201. Each object in the Inheritance Table 201 has an Inherited Object ID 202. Each ID 202 is listed with all of the ID's 203 that the object 202 inherits from (Assigned Object ID 203). A sequence number 204 indicates the order of the inheritance (in the hierarchy). The Inheritance Table 201 can contain hundreds of thousands of users and products.

For example:
1. Skip inherits from Skip, Sequence Number one.
2. Skip inherits from Bx Engineering, Sequence Number two.
3. Skip inherits from APD, Sequence Number three.
4. Skip inherits from AOL, Sequence Number four.
5. Christmas Light Bulbs (CLB) inherits from CLB, Sequence Number one.
6. CLB inherits from Light Bulbs, Sequence Number two.
7. CLB inherits from Electrical Goods, Sequence Number three.
8. CLB inherits from Durable Goods, Sequence Number four.

Referring to FIG. 3, A Relationship Table 301 contains a Relationship ID 302, a Role 303, and an Assigned Object ID 304.

Relationships are stored in multiple rows of the Relationship Table 301. For example, a relationship has a Role of Product, with the Assigned Object ID of Electrical Goods products group. The other Role is Buyer and the Assigned Object ID would be the division's. There are two rows entered in the Relationship Table 301 for this relationship. Here, the Role of Product 306 has a Relationship ID of 1000 305 with the Assigned Object ID of Electrical Goods 307. The other row has Buyer 309 as the Role with a Relationship ID of 1000 308 and the Assigned Object ID of the division, which is APD 310.

To look up all of the objects participating in a certain relationship, the system looks for all the rows that have a particular relationship ID, for example, all objects with a relationship ID of 1000.

The entries in the Relationship Table 301 reflect what the Administrator was thinking when creating the table. Entries typically correspond to clauses of contracts, for example, goods used for resale have a tax of zero, or goods used for internal consumption have a tax of 8.25%.

The contract clause analogy in this example deals with electrical goods at the APD level, but when trying to evaluate the rule at the order level, what the system knows is Skip and Christmas Light Bulbs, it doesn't know where the assignment was made. The relationship and Inheritance tables are joined through the Assigned Object, the assigned object ID of electrical goods in the relationship table corresponds to electrical goods in the inheritance table, which Christmas light bulbs inherits from. The assigned object ID for APD in the relationship table also corresponds to APD in the inheritance table, which Skip inherits from.

A generic SQL statement can be made, given the object that the user wants to query about (e.g., Skip and Christmas Light Bulbs and their respective roles), to find all the assignments that have been made.

With respect to FIG. 4, an Assignment Table 401 is provided. The table has the columns: Assignment ID 402; Relationship ID 403; Attribute Name 404; Attribute Type 405; Value 406; Sequence Number 407; Operation 408; and JavaScript Model Name 409.

The JavaScript Model Name 409 is the name of a JavaScript routine that is called when the assignment is finally resolved. For example, once the table values are resolved, a value may be a result. This value cannot be efficiently processed through the database (through complex operations) but instead is fed into a JavaScript function so that an arbitrary operation can operated on the value.

The JavaScript Model Name for an attribute can be assigned to the system and overridden as desired, just as values can. As the system is processing the inheritance of the attribute values it will also process the inheritance of the JavaScript Model Name using the same algorithm with the following two differences:

Attribute values can have various operations such as LIFO, UOS, IOS, etc. The only "operation" defined for Model Name is LIFO.

Attribute values can be assigned without changing the Model Name, but not vice versa. If an entry exists in the assignment table, it by definition makes an attribute value assignment. An entry in the assignment table does not necessarily change the Model Name.

The attribute value can be used in the script. Analogous to the role of the "this" keyword in Java and C++, a special variable (or value) is used in the script to refer to the attribute value for the relevant relationship. The default script that's used if one isn't assigned is 'return Value.'

Relationships to which attribute values are assigned comprise objects and their roles in the relationship. The definition of each attribute includes the list of roles that participate.

When evaluating a Rule, the system performs the following steps:
1. Retrieve the list of roles for the homonymous attribute.
2. For each role, retrieve the id of the homonymous object. Use System (id="0") for any undefined or null objects.
3. Retrieve the attribute value and business logic using those role/id pairs.
4. Execute the retrieved Logic using the retrieved value for 'Value'.

Here, the Attribute Name 404 is Shipping Method 411 that is of Type String 412. The Value is UPS 413 and the Relationship ID is 1000 410. The Relationship ID of 1000 414 matches Relationship IDs in the Relationship Table 301. When Skip buys Christmas Light Bulbs from any vendor, Skip 208 inherits from APD 209 which has a Relationship ID of 1000 308 and matches to the Relationship ID of 1000 410 in the Assignment Table 401. The Shipping Method 411 shows that UPS 413 is the preferred shipping method.

However, when the Shipping Method 415 entry is added to the Assignment Table 401, the result changes. Skip 205 also inherits from Bx Engineering 206. Bx Engineering 313 has a Relationship ID of 1001 311. The only entry (in this example) in the Assignment Table 401 that corresponds to Relationship ID 1001 414, shows that the Shipping Method 415 is Will Call 417.

The highest sequence number wins when there is a conflict, i.e. the sequence number most specific to the object (highest or lowest—determined by the resolution strategy (described below)) wins. Here, Skip 205 inherits from Bx Engineering 206 with a Sequence Number of two 207, while Skip 208 also inherits from APD 209 with a Sequence Number of three 210. The Shipping Method will therefore be Will Call 417 because Skip has a higher Sequence Number inheriting from Bx Engineering.

Referring to FIG. 5, the Attribute Voter Table 501 is used to resolve further conflicts. For example, a conflict will arise when the system finds that Bx Engineering has a shipping method for Electrical Goods and Products has a shipping method for Durable Goods (the conflict arises because the Company and Product hierarchies have their own shipping methods and only one can be used). The Attribute Voter Table 501 contains an Attribute ID 502, a Role 503, and a Sequence Number 504 that the role plays. Here, Buyer 506 can be given a higher Sequence Number 504 than Product 505 which will give the Buyer role in the Company hierarchy precedence over the Product role in the Product hierarchy.

Figure 6:
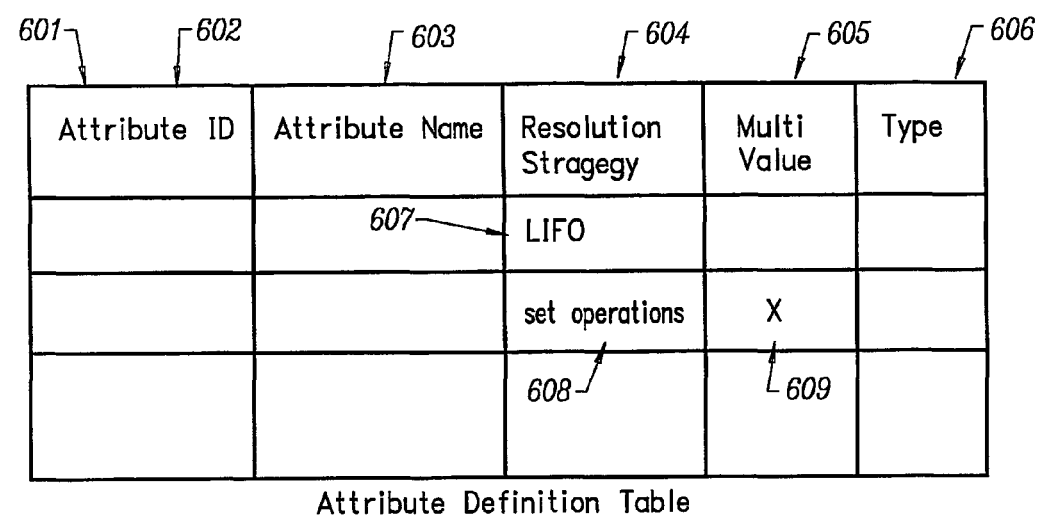

With respect to FIG. 6, an Attribute Definition Table 601 contains an Attribute ID 602, Attribute Name 603, Resolution Strategy 604, a boolean flag Multi Value 605, and a Type (e.g. String) 606. The Resolution Strategy 604 is used to resolve conflicts that arise when the system SQL query returns a list of items. For example, LIFO 607 can be specified and the system will choose the top item in the list (e.g. the highest sequence number). If the user's interaction is required, set operations 608 can be specified and Multi Value selected 609. This will present a list to the user and allow the user to choose from the list (e.g. what shipping method the user wants). Multi Value 605 allows multiple values from the query to be displayed.

One of the challenges is that when changes are made to different levels of the hierarchy, the change must be propagated throughout the hierarchy. For example, given that AOL has three shipping methods and APD has one, if another shipping methods is added to AOL, then it must propagate down to APD. The Attribute Definition Table 601 is used to create the resulting sets from the SQL query.

Figure 7:
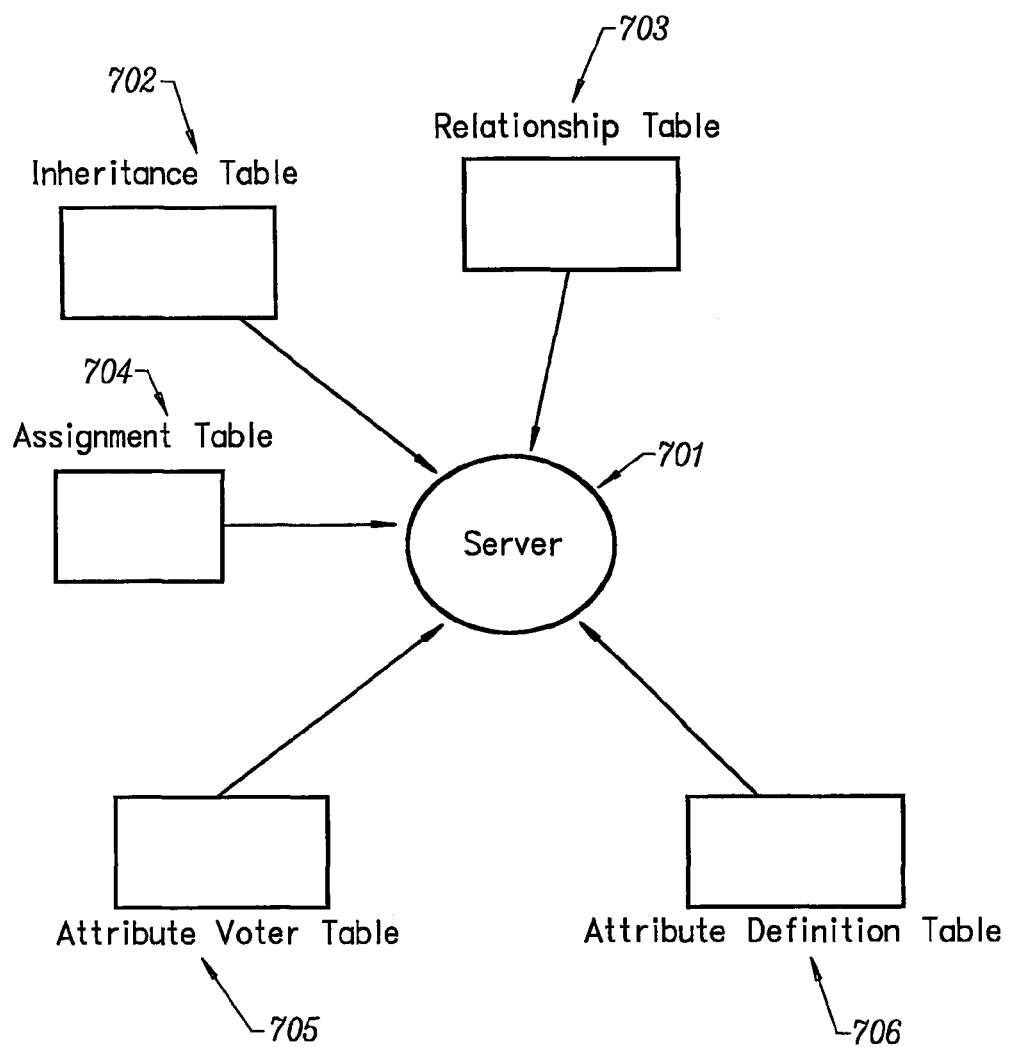
FIG. 7 is a block schematic diagram depicting server interaction with a set of inheritance, relationship, assignment, attribute voter, and attribute definition tables according to the invention.

Referring to FIG. 7, a high level system interaction view is shown. The Server 701 retrieves the roles from the Inheritance Table 702 and the Relationship Table 703. Using Relationship IDs obtained from the Inheritance Table 702 and Relationship Table 703, the Server 701 derives values from the Assignment Table 704. The Attribute Voter Table 705 and Attribute Definition Table 706 are used by the Server 701 to resolve any conflicts that arise from the values obtained from the Assignment Table 704.

One skilled in the art will readily appreciate that although shipping methods and e-commerce applications are specifically mentioned herein, the invention applies equally to other organizational parameters, access control rules, and other applications that use inheritable attributes.

A more detailed example follows and further explains the details of the invention:

1 A More Detailed Example

The problem of assigning string attributes to objects arranged in a hierarchy will first be described. The following example uses hierarchical groups and organizational units (departments, divisions, etc.), but the technique is the same whether the objects are membership objects, catalog nodes, or other kinds of objects.

An example using a Ford installation of Netscape Communication Corp.'s BuyerXpert with an org chart is shown below. Tim Cook is a Director in the Recharging System department. Ted Edgar is a VP in the Strategic Projects group at Ford Credit. Laura Taylor, Ted Edgar, Tim Cook, and Jim Moreland are working on the Starfire Project. A "Starfire Project" group has been created for them and the other team members. For purposes of this example, assume that Grainger is in the "Direct Suppliers" group and that CSX is in the "Indirect Suppliers" group.

All objects have a unique ID (e.g. 'C1000'). In reality, this could be a 128-byte GUID, but this document uses a simpler format for readability. The type of an object may be inferred from the initial letter(s) of the IDs used in this document.

```
Ford, Inc. Org Chart

Ford, Inc. (C1000)
    Ford Motor Company, Inc. (C1001)
        North American Sales (OU1002)
            Dealer Relations (OU1003)
                Western Region (OU1004)
                    Laura Taylor (U1000)
            New Car Development (OU1005)
                Engineering (OU1006)
                    Electric Cars (OU1007)
                        Recharging Systems (OU1008)
                            Tim Cook (U1001)
                    Testing (OU1009)
                        Project Management (OU1010)
                            Jim Moreland (U1002)
                            Rhonda Phillip (U1003)
        Starfire Project (G1011)
        VIPs (G1012)
            VPs (G10013)
            Directors (G1014)
        Direct Suppliers (G1020)
        Indirect Suppliers (G1021)
    Ford Credit, Inc. (C1015)
        Strategic Projects (OU1016)
            Ted Edgar (U1004)
CSX, Inc. (C1024)
    Price List (PL1241)
    Product (P1240)
Boise (C1026)
    Price List (PL1261)
    Product (P1260)
```

1.1 A Simple Attribute Table

Figures 8, 9:
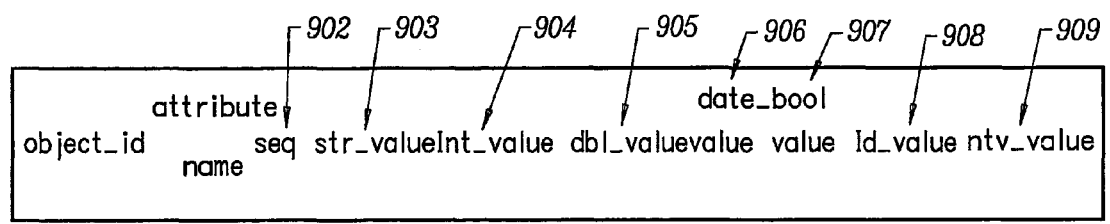
FIG. 8 is a diagram of an exemplary simple attribute assignment table according to the invention.
FIG. 9 is a diagram of an exemplary simple attribute assignment table with types added according to the invention.

Referring to FIG. 8, the traditional way of indicating freight terms via an attribute table is shown. Since freight terms are set for Ford overall, they are assigned to Ford, Inc. (C1000).

As shown, the attribute table provides name:value pair storage. There are two ways that one would want to make this table more flexible. The first is to support arrays. This is easily accomplished by adding a column for a sequence number. The combination of object_id, attribute_name and sequence number is constrained to be unique.

The second addition is to provide for data types other than strings. While other data types can be converted to and from strings, implementing queries such as "SELECT object_id WHERE attribute_name='MAX_ORDER_SIZE' AND value 100000" becomes inefficient since every string must be converted to a number for comparison. While 500 is less than 100000, the string "500" is greater than "100000".

With respect to FIG. 9, with the addition of array support and native types, the attribute table might look like 801. It is possible to add other types to this table.

From this point forward in this paper, assume that everyplace a "value" column is seen, it's really eight columns, "seq" 902, "str_value" 903, "int_value" 904, "dbl_value" 905, "date_value" 906, "bool_value" 907, "id_value" 908, and "ntv_value" 909.

2 Problem Statement

There are several ways in which the simple attribute table in FIG. 8 is insufficient. First, consider inheritability. The administrator desires that the value assigned to Ford should be inherited by all the organizational units (OUs) under it. The most obvious way to determine the FREIGHT_TERMS_ID for Tim Cook is to look at his organization (Recharging Systems) and scan up the org chart until a value is found, and repeat the scan for the groups he's in ("Starfire Project" and "Directors"). In this simple example, that's a minimum of 10 separate SQL statements. The problem here isn't that attributes can't be inherited, just that it's very inefficient to do so.

Second is the fact that attributes frequently are required to be dependent on some relationship. This is seen when a buyer company may choose to use a different set of payment methods depending on the suppliers. This is especially important as the number of companies increases and it becomes impractical to maintain duplicate information in many "silos" (i.e. "islands") of information. Inheritability on both sides of the relationship is an important feature. The simple attribute table has no provision for relationship-based attribute values at all.

This document describes a solution to these problems.

3 Inheritance Optimizations 3.1 Promiscuous Write

While it's possible that the attribute value can be determined by scanning upward through the org chart, it makes sense to optimize the process for reading, since there are a lot more read operations than writes. One method of optimizing for read operations would be to write the attribute value to all the subordinate OUs whenever a value is written. This mechanism is called the "promiscuous write" optimization. The resulting attribute table is shown in FIG. 10.

For sake of example, let's say that the FREIGHT_TERMS_ID attribute for the "Electric Cars" org unit (OU1007) is changed to 1220, then at a later time, the company experiments with setting the FREIGHT_TERMS_ID to 1220 for all of New Car Development (OU1005). The table for that would then appear as shown in FIG. 11.

If the New Car Development department then wants to revert back to 1234, the system has no way knowing that the Electric Cars department should be kept at 1220. Because the knowledge of which values have been assigned and which are inherited is not reflected anywhere in the database, the system will change settings the administrator didn't mean to change.

To solve this problem, it is possible to add one or more columns that reflect which object was the actual assignee. The table in FIG. 11 would then look like the table in FIG. 12 after the FREIGHT_TERMS_ID is set to 1220 for both Electric Cars and New Car Development:

With this structure one can determine which values have been assigned and which are inherited, as well as quickly update all the records that reflect inheritance from a single assignment.

There are four kinds of update operations, updates to existing assignment, adding a new assignment, deleting an assignment, and updating the hierarchy.

3.1.1 Updating an Existing Assignment

To change the assignment of FREIGHT_TERMS_ID for New Car Development a single SQL statement suffices:
UPDATE attribute_table SET value=1234,
    assigned_obj_id='C1000' WHERE
    assigned_obj_id='OU1005' AND
    attribute_name='FREIGHT_TERMS_ID'

The setting for Electric Cars (OU1007) would remain unchanged.

For this simple kind of update the write operation isn't much more expensive than a read operation.

3.1.2 Adding an Assignment

There are two other kinds of updates that need to be supported: adding and deleting assignments, and changes to the organizational structure.

The admin function must update each of the subordinate objects to reflect the new assignment when adding and deleting assignments. For example the following SQL statement could add the FREIGHT_TERMS_ID=1220 assignments for New Car Development:
UPDATE attribute_table SET value=1220,
    assigned_obj_id='OU1005' WHERE object_id IN
    ('OU1005', 'OU1006', 'OU1009', 'OU1010') AND
    attribute_name='FREIGHT_TERMS_ID'

FIG. 12 shows the results of such an UPDATE.

3.1.3 Deleting an Assignment

The following SQL statement could remove the assignment made in 3.1.2:
UPDATE attribute_table SET value=1234,
    assigned_obj_id='C1000' WHERE
    assigned_obj_id='OU1005' AND
    attribute_name='FREIGHT_TERMS_ID'

3.1.4 Updating the Hierarchy

When the org structure changes, the following three cases must be considered:

The attribute is assigned to the object being moved. In this case the attribute table doesn't have to be updated.

The object inherits the attribute value, and the new position in the org chart results in inheriting the attribute value from the same object as the old position. In this case the attribute table doesn't have to be updated.

The object inherits the attribute value, and the new position inherits from a different object than the old. This case requires an SQL statement similar to adding a new assignment.

3.2 Normalization

Those familiar with relational databases will note the opportunity to normalize the data in the "Promiscuous write" example. Instead of storing a lot of redundant data, two tables can be used. One table stores the assignments and another table improves the performance of read operations. The present example can be represented by the two tables in FIGS. 13 and 14.

The two tables are joined by the assignment.assigned_obj_id=inheritance.assigned_obj_id columns. The discussion of SQL statements in the previous section applies to this schema as well, with minor changes.

Normalization is not really necessary at this stage in the discussion. The schema used in the table in FIG. 11 uses a bit more space than the normalized solution, but unless there are a lot of attribute values that consume large amounts of storage, the benefit it brings is debatable. The next section investigates when normalization becomes a necessity.

3.3 Expanded Inheritance Table

The inheritance table shown in FIG. 14 is fine for one attribute, but there are many attributes (200), any one of which might be assigned to any object in the hierarchy. The easiest and most efficient way to handle this is to list, for each object, all of its ancestors. Using our example, the inheritance table would look like the table in FIGS. 15a, 15b, 15c, 15d.

Note that FIGS. 15a, 15b, 15c, 15d also show the "System" (O) object at the top of the hierarchy. The utility of this will be seen below.

The inh_seq column indicates the order (i.e. precedence) in which an object inherits attribute values from its ancestors.

Moving an OU from one place in the org chart to another involves a substantial number of deletions and insertions from the inheritance table, but fortunately that doesn't happen on an hourly or daily basis in most companies.

3.4 Group Membership

Each object would also have a row for each group they belonged to and all the super-groups of those groups. If Tim Cook were a member of the Directors group (1014), additional rows would be present in the object inheritance table, as shown in FIG. 16.

Group membership is not restricted to Users. Companies, OUs, other groups and virtually any resource can belong to a group.

3.5 Example Read Operation

Referring to FIG. 17, an example of reading an attribute value for Tim Cook is shown. The Select statement "SELECT value FROM v_attributes WHERE object_id= 'U1001' AND attribute_name='FREIGHT_TERMS_ID' would yield the two rows in the result as shown in FIG. 17.

It is the job of the attribute server to pick the value (or values, in the case of multi-valued attributes) with the highest inh_seq value.

4 Relationship-Based Assignments

Attributes may be set on a singleton object, but in many cases it's desirable to assign attribute values to a relationship between two or more objects. For example, Ford may be willing to use one set of payment methods for direct supplies, but a different set of payment methods for indirect. It's not unusual for companies to classify and/or stratify their suppliers and the present example will use the following supplier groups:

Direct Suppliers (G1020)

Indirect Suppliers (G1021).

Other (and maybe better) examples of relationship-based assignments include limiting purchasing authority to certain catalog nodes, and pricing adjustments that depends on both the user (i.e. requester) and product group.

4.1 Object Roles

Each object in a relationship is defined as having a role. For example, the object fulfilling the "Product" role may be a product, or it may be a product group, commodity type or a supplier.

A corollary is that a company may be assigned a role of PRODUCT (as the default for products it sells) or CURRENT_USER or any other roles that it may set the defaults for. If this doesn't make sense yet, keep reading. It will hopefully become clearer.

Each attribute has an array of roles that determine the value of the attribute. The attribute server will automatically use the system object (O) in any roles that isn't otherwise specified on both read and write operations.

4.2 Relationship Table

Each relationship is defined as a set of tuples. Each tuple consists of a Role and an Object ID. FIG. 18 shows an example of the corresponding database table where the relationship is between User, Product and PriceList roles.

Look back at the normalized assignment table in Section 3.2, FIG. 11. Because assignments are now made for relationships, not singleton objects, instead of an "assigned_object_id", the assignment table will have a "reln_id" column (relationship ID).

4.3 Inheritance

The challenges in adding relationships are similar to those setting attributes. Frequently, one or more roles are assigned not just to a "leaf" object but to an aggregating object such as a Group or a Company. For purposes of this example, assume that Grainger is in the "Direct" group, and that Boise is in the "Indirect" group.

FIGS. 19 and 20 show how the assignment and relationship tables would be set up to assign 1234 as the default PRICE_LIST_COLUMN_LOOKUP table for Ford, Inc. regardless of the supplier, and 1220 as the PRICE_LIST_COLUMN_LOOKUP for the Electric Cars org unit buying from the Direct group of suppliers.

Notice in relationship 134 1901 that the USER role 1902 is being filled by an Org Unit 1904, the PRODUCT role 1903 is being filled by a Group of suppliers 1905, and the PRICE_LIST role 1907 is being filled by the System object 1906. Because of the inheritance capabilities of this design, any user in the Electric Car group buying any product from any supplier in the Direct group using any price list will automatically use the PRICE_LIST_COLUMN_LOOKUP 2006 table 1220 2005.

The assignment to relationship 110 2003 shows that the default for all purchases by Ford is to use the PRICE_LIST_COLUMN_LOOKUP 2001 table 1234 2002.

The select statement for retrieving the PRICE_LIST_COLUMN_LOOKUP table id when Tim Cook purchases from product 'P1260' from Boise using Price List 'PL1261' would be:

```
SELECT      usr.inh_seq                                          USR_SEQ,
            prod.inh_seq                                         PROD_SEQ,
            pl.inh_seq                                           PL_SEQ,
            asgt.value                                           VALUE
   FROM            t_inheritance                                 usr,
                   t_inheritance                                 prod,
                   t_inheritance                                 pl,
                   t_relationship                                usr_reln,
                   t_relationship                                prod_reln,
                   t_relationship                                pl_reln,
                   t_assignment                                  asgt
WHERE  asgt.attribute_name = 'PRICE_LIST_COLUMN_LOOKUP'
       AND        usr.object_id           =                      'U1001'
       AND usr.assigned_obj_id = usr_reln.assigned_obj_id        # user
inheritance                                                      join
       AND usr_reln.reln_id = asgt.reln_id                       # user
relationship                                                     join
       AND        usr_reln.role           =                      'USER'
       AND        prod.object_id          =                      'P1260'
       AND    prod.assigned_obj_id = prod_reln.assigned_obj_id   #
product           inheritance                                    join
       AND    prod_reln.reln_id = asgt.reln_id                   #
product           relationship                                   join
       AND        prod_reln.role          =                      'PRODUCT'
       AND        pl.object_id            =                      'PL1261'
       AND    pl.assigned_obj_id = pl_reln.assigned_obj_id       #
pricelist         inheritance                                    join
       AND    pl_reln.reln_id = asgt.reln_id                     #
pricelist         relationship                                   join
       AND        pl_reln.role            =                      'PRICE_LIST'
ORDER                                                            BY
       USR_SEQ,           PROD_SEQ,                              PL_SEQ
```

The result set for this query is shown in FIG. 21.

If, on the other hand, Tim Cook were buying P1240 off price list PL1241 from CSX, the result set of the database query would be as shown in FIG. 22.

4.4 Conflict Resolution

In section 3.5 it was noted that the attribute server must pick the attribute values with the highest inheritance sequence numbers. With relationship-based assignments, it's easy to imagine a situation where if you order assignments by the inheritance sequence numbers of one role, they would appear in a different order than if ordered by those of another role. For example, if New Car Development were assigned a value for the PRICE_LIST_COLUMN_LOOKUP table attribute when ordering from CSX using price list PL1241, the result set would be as shown in FIG. 23.

In this scenario, the product and price list inheritance sequence numbers indicate that 1367 should be used but the user inheritance sequence number indicates that 1220 should be used. Which is right? This "conflict" isn't inherently "bad", nor does it need to be prevented; we just need a deterministic way of judging deciding in which order we want to process the result set. The answer lies in the definition of the attribute. Note that in section 4.1 it was stated that each attribute definition defines an array of roles that can be used to determine the attribute value. The attribute definition determines in which order the inheritance sequence numbers are used to order the result set. The ORDER BY clause in the SELECT statement above specifies "USR_SEQ, PROD_SEQ, PL_SEQ", corresponding to the hypothetical ordering of roles in the PRICE_LIST_COLUMN_LOOKUP attribute definition.

5 Multiple Inheritance

So far, the above examples have focused on simple trees, where every object other than the tree root belongs to one object. In other situations an object may be owned by one object but be a member of one or more groups. In other words, the object may inherit from more than one group. Examples include Users that belong to multiple groups and groups that belong to multiple groups. There is no distinction between inheritance at the object or target side of the relationship.

Multiple inheritance is easily represented in the inheritance table by listing all the groups and their ancestors. Duplicate ancestors will, of course, be omitted, but ambiguity arises as to the order in which group memberships should be listed in the inheritance table, and whether group memberships should be listed before or after the "owner". For example, if Tim Cook is a member of the Starfire and Directors groups, which inheritance table rows get what inheritance_seq values? There's no absolute "right" answer, but it's not difficult to let the administrator pick the order. The owner should be listed before any of the groups, allowing the groups to override the organization setting.

5.2 Constructing the Inheritance Table

Let's look at an example. If Tim Cook is listed as a member of Starfire and Directors groups, here is how the inheritance table for Tim Cook is constructed.
1. Read the organization's inheritance table, and use that list of assigned objects as the starting point. Tim's inheritance table starts out as shown in FIG. 24.
2. Next, read the inheritance table entries for the least significant group, in this case "Directors" (id=1014), and add them to Tim's list as shown in FIG. 25. Entries that are already in the inheritance table are not duplicated.
3. Repeat step 2 as necessary for each group in the reverse order of significance. In this case the "Starfire Project" (id=1011) is next, as shown in FIG. 26.
4. Add the User's own object as shown in FIG. 27.

When (re)structuring the org chart such that a multiple inheritance situation is created, we have the option of asking the administrator which order to list the parents, or we can base it on some policy such as placing the most recently added group memberships last.

6 Miscellaneous Issues 6.1 Dealing With Arrays

Referring back to FIG. 9 note the sequence number field ("Seq") that allows the assignment table to handle arrays. Where assignments to low level objects override inherited values, handling array attributes is no different than handling single-valued attributes; however, arrays present other challenges.

Frequently it's desirable to add to or subtract from the set of values being inherited. For example, if the Electric Cars division gets an additional pricing adjustment when buying from Direct Suppliers, it would be nice to specify that pricing adjustment without overriding all the inherited adjustments. If all the inherited adjustments are overridden, then changes to the company's adjustment settings won't have an affect on the Electric Cars department.

When reading a multi-valued attribute, the attribute server needs to know whether to override all the inherited values with a new array of values, add another element to the array, or delete an element from the array. In order to facilitate this capability, an "operation" column needs to be added to the assignment table. The operation column is defined to have the following values:

| Value | Description |
| --- | --- |
| 0 | override (LIFO) |
| 1 | add value (UOS) |
| 2 | remove value |
| 3 | IOS |
| 4 | merge |
| 5 | lowest |
| 6 | highest |

"IOS" and "remove value" differ in that with "remove value", the attribute server will remove the specified value if it is currently in the value. With IOS, the attribute server will remove ALL values EXCEPT the ones specified. The "merge" operation is used for NTV values.

FIGS. 28a and 28b show the results of the types of set operation on different sets. Arrays of NTVs are not allowed.

An example of the Electric Cars division getting an addition pricing adjustment when buying from Direct Suppliers is shown in the table in FIG. 29.

It was noted in section 3.5 that the attribute server must pick the attribute values with the highest inheritance sequence numbers. To allow for adding and removing values from the inherited set, the attribute server must process the result set in order of the inheritance sequence numbers using the precedence indicated by the attribute description.

If the values in the table in FIG. 29 were the attribute table rows returned by a SELECT statement, the array of values that would be returned to the attribute client wound be [2000, 2001, 2002, 2003]. If however, the operation field in the last row were 0 instead of 1, the array of values that the attribute server would return to the attribute client would be [2003] since the assignment to the 'Direct' group would override the default assignments.

In theory, it is possible to specify both add and negate operations (but not override or IOS) for different values of a given attribute assignment, and the implementation should allow for it, but in practice the operations for all the values of a given assignment are likely to be the same.

6.2 Scalability

The inheritance table shown in FIGS. 15a, 15b, 15c, and 15d looks pretty large. If an organization has L levels of hierarchy, M users, and each user is a member of N groups, the table size is on the order of (L+N+1)×M. At the end of 1996, Ford had 372,000 employees world-wide. If Ford employees are an average of 6 levels down from the top of the org chart and belongs to an average of 3 user groups, the inheritance table would have 3,720,000 rows in it. Furthermore, if they had 5 catalogs with a total of 200,000 parts, each an average of 5 levels deep in the catalog and belonging to 2 product groups, there would be another 1,600,000 rows in the inheritance table, for a total of 5,320,000 rows.

Another example is the Wall Street Journal with 1.7 M subscribers. A likely implementation scenario is 3 levels of hierarchy and 2 additional user groups per user. That scenario leads to 10,200,000 records in the inheritance table.

6.3 The System Object

The System object is treated as a first class citizen in the hierarchy. Attribute values that don't depend on a specific relationship can be assigned to the "System" object. System defaults can be set up by specifying the System in all Roles. The SELECT statements used to read an attribute will pick up these values automatically.

7 Schema Summary

7.1 Assignment Table

| | | |
|---|---|---|
| asgt_id | int | non-null. Each assigned object, assigned target, and attribute name triplet has a unique asgt_id. (PK) |
| attr_id | int | non-null. Joins assignment table with attribute definition. (FK) non-null. Joins the assignment table with the relationship table. |
| reln_id | int | Identifies the relationship that was assigned this value (as oppose to objects that inherit). (FK) |
| value_seq | int | sequence number within an array of values. 1-based. |
| str_value | str | attribute value |
| int_value | int | integer value |
| dbl_value | dbl | double or amount value |
| date_value | date | date/time value |
| bool_value | bool | boolean value |
| ntv_value | str | NTV value |
| id_value | str | GUID of an object. |
| unit_id | int | unit associated with value |
| currency_id | int | currency associated with value |
| operation | int | override, add to or remove from inherited attribute values. For a single-valued attribute, the operation is always override. |
| logic | blob | compiled rule logic. |

7.2 Inheritance Table

| | | |
|---|---|---|
| object_id | str | non-null. GUID |
| assigned_object_id | int | non-null GUID. Joins inheritance table with relationship table. |
| inheritance_seq | int | non-null. 1-based. |

The combination of object_id and assigned_object_id is unique.

7.3 Relationship Table

| | | |
|---|---|---|
| rein_id | int | non-null. (PK) |
| role | str | (BUYER, SELLER, PRODUCT, PRICELIST, etc.) |
| assigned_object_id | str | non-null GUID. |

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process for combining relationship-based inherited attributes in a computer environment, comprising the steps of:
   providing a table-driven relational database system, comprising an inheritance table and a relationship table,
   wherein said inheritance table comprises:
      an inherited ID field;
      an assigned object ID; and
      a sequence number field, wherein said sequence number indicates the order of inheritance of the object in a hierarchy;
   wherein said relationship table comprises:
      a relationship ID field, wherein said relationship ID uniquely identifies said relationship;
      a role; and
      an assigned object ID field; and
   wherein a table-driven relational database server queries said inheritance table and said relationship table and uses a link to link said inheritance table with said relationship table via a common element of a field of each table and obtains all linked objects that are associated with said link,
   wherein said linked objects are used to control a determinative business rule and access rule and wherein said sequence ID indicates a priority for said role,
   wherein a user writes at least one of said determinative business rule and said access rule having at least one configurable parameter.

2. The process of claim 1, further comprising the steps of:
   providing an assignment table;
   said assignment table contains an assignment ID, relationship ID, and value field; and
   wherein the server obtains a value from said assignment table using said objects.

3. The process of claim 2, wherein the server passes said value to a script named by said assignment table; and wherein said script executes a specified function using said value.

4. The process of claim 2, wherein said value indicates the ultimate status of said determinative business rule or said access rule.

5. The process of claim 2, further comprising the steps of:
   providing an attribute voter table;
   said attribute voter table contains an attribute ID, role, and sequence number field, wherein said sequence number indicates the order of inheritance of the attribute/role pair in a hierarchy; and
   wherein the server uses said attribute voter table to resolve any conflicts that arise if multiple values correspond to said objects.

6. The process of claim 5, wherein each role in said relationship table is assigned a corresponding sequence number in said attribute voter table.

7. The process of claim 2, further comprising the steps of:
   providing an attribute definition table;
   said attribute definition table contains an attribute ID, resolution strategy, and multiple value field;
   wherein the server uses said attribute definition table to resolve any conflicts that arise if multiple values correspond to said objects.

8. The process of claim 7, wherein said resolution strategy is used to resolve said conflicts; and wherein said resolution strategy comprises any of the operations:
remove value;
merge;
lowest;
highest;
override; and
add value.

9. The apparatus of claim 8, wherein said inherited ID is linked with said assigned object ID.

10. The process of claim 7, wherein said multiple value is selected when an array of values is used in the resolution strategy.

11. The process of claim 1, wherein said user comprises a system administrator.

12. The process of claim 11, wherein both said business rule and said access rule are implemented in an e-commerce environment.

13. The process of claim 1, wherein said inherited ID comprises an inherited object ID.

14. The process of claim 1, wherein said inherited ID is linked with said assigned object ID.

15. An apparatus for accessing relationship-based inherited attributes in a computer environment, comprising:
a table-driven relational database system, comprising an inheritance table and a relationship table,
wherein said inheritance table comprises:
an inherited ID field;
an assigned object ID; and
a sequence number field, wherein said sequence number indicates the order of inheritance of the object in a hierarchy;
wherein said relationship table comprises:
a relationship ID field;
a role; and
an assigned object ID field; and
wherein a table-driven relational database server queries said inheritance table and said relationship table and establishes a link between said inheritance table and said relationship table via a common element of a field of each table and obtains all linked objects that are associated with said link and wherein said sequence ID indicates a priority for said role,
wherein said linked objects are used to control a determinative business rule and access rule,
wherein said determinative business rule comprises use in e-commerce.

16. The apparatus of claim 15, further comprising:
an assignment table;
said assignment table contains an assignment ID, relationship ID, and value field; and
wherein the server obtains a value from said assignment table using said objects.

17. The apparatus of claim 16, wherein the server passes said value to a script named by said assignment table; and wherein said script executes a specified function using said value.

18. The apparatus of claim 16, wherein said value indicates the ultimate status of said determinative business rule or said access rule.

19. The apparatus of claim 16, further comprising:
an attribute voter table;
said attribute voter table contains an attribute ID, role, and sequence number field, wherein said sequence number indicates the order of inheritance of the attribute/role pair in a hierarchy; and
wherein the server uses said attribute voter table to resolve any conflicts that arise if multiple values correspond to said objects.

20. The apparatus of claim 19, wherein each role in said relationship table is assigned a corresponding sequence number in said attribute voter table.

21. The apparatus of claim 16, further comprising:
an attribute definition table;
said attribute definition table contains an attribute ID, resolution strategy, and multiple value field;
wherein the server uses said attribute definition table to resolve any conflicts that arise if multiple values correspond to said objects.

22. The apparatus of claim 21, wherein said resolution strategy is used to resolve said conflicts; and wherein said resolution strategy comprises any of the operations:
remove value;
merge;
lowest;
highest;
override; and
add value.

23. The apparatus of claim 21, wherein said multiple value is selected when an array of values is used in the resolution strategy.

24. The apparatus of claim 15, wherein said business rule comprises control over at least five of:
pricing;
shipping;
durable goods;
products;
sales;
taxes; and
payment.

25. The apparatus of claim 15, wherein a user accesses and controls at least one of said determinative business rule and said access rule using at least one configurable parameter.

26. A program storage medium readable by a computer, tangibly embodying a program of instructions executable by the computer to perform method steps that combine relationship-based inherited attributes in a computer environment, comprising the steps of:
providing a table-driven relational database system, comprising an inheritance table and a relationship table;
wherein said inheritance table comprises:
an inherited ID field;
an assigned object ID; and
a sequence number field, wherein said sequence number indicates the order of inheritance of the object in a hierarchy;
wherein said relationship table comprises:
a relationship ID field;
a role; and
an assigned object ID field; and
wherein a table-driven relational database server queries said inheritance table and said relationship table and establishes a link between said inheritance table and said relationship table via a common element of a field of each table and obtains all linked objects that are associated with said link and wherein said sequence ID indicates a priority for said role,
wherein said linked objects are used to control a determinative business rule used in e-commerce and access rule used in e-commerce.

27. The method of claim 26, further comprising the steps of:
- providing an assignment table;
- said assignment table contains an assignment ID, relationship ID, and value field; and
- wherein the server obtains a value from said assignment table using said objects.

28. The method of claim 27, wherein the server passes said value to a named JavaScript routine obtained from said assignment table; and wherein said JavaScript routine executes a specified function using said value.

29. The method of claim 27, wherein said value indicates the ultimate status of said determinative business rule or said access rule.

30. The method of claim 27, further comprising the steps of:
- providing an attribute voter table;
- said attribute voter table contains an attribute ID, role, and sequence number field, wherein said sequence number indicates the order of inheritance of the attribute/role pair in a hierarchy; and
- wherein the server uses said attribute voter table to resolve any conflicts that arise if multiple values correspond to said objects.

31. The method of claim 30, wherein each role in said relationship table is assigned a corresponding sequence number in said attribute voter table.

32. The method of claim 27, further comprising the steps of:
- providing an attribute definition table;
- said attribute definition table contains an attribute ID, resolution strategy, and multiple value field;
- wherein the server uses said attribute definition table to resolve any conflicts that arise if multiple values correspond to said objects.

33. The method of claim 32, wherein said resolution strategy is used to resolve said conflicts; and wherein said resolution strategy comprises any of the operations:
- remove value;
- merge;
- lowest;
- highest;
- override; and
- add value.

34. The method of claim 32, wherein said multiple value is selected when an array of values is used in the resolution strategy.

35. The method of claim 26, wherein said inherited ID is linked with said assigned object ID.

36. A method that combines relationship-based inherited attributes in a computer environment, comprising the steps of:
- providing a table-driven relational database system, comprising an inheritance table and a relationship table,
- wherein said inheritance table comprises:
  - an inherited ID field;
  - an assigned object ID; and
  - a sequence number field, wherein said sequence number indicates the order of inheritance of the object in a hierarchy; and
- wherein said relationship table comprises:
  - a relationship ID field; and
  - an assigned object ID field;
- querying said inheritance table and said relationship table by means of a table-driven relational database server;
- establishing a link between said inheritance table and said relationship table via a common element of a field of each table; and
- obtaining linked objects that are associated with said link; and
- controlling determinative business rules and access rules in e-commerce using said linked objects.

* * * * *